United States Patent
Ikegaya et al.

(10) Patent No.: US 8,438,565 B2
(45) Date of Patent: May 7, 2013

(54) VIRTUAL MACHINE MIGRATION MANAGING METHOD, COMPUTER USING THE METHOD, VIRTUALIZER USING THE METHOD AND COMPUTER SYSTEM USING THE METHOD

(75) Inventors: Naoko Ikegaya, Sagamihara (JP); Tomoki Sekiguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/415,364

(22) Filed: Mar. 8, 2012

(65) Prior Publication Data

US 2012/0180051 A1    Jul. 12, 2012

Related U.S. Application Data

(63) Continuation of application No. 12/957,568, filed on Dec. 1, 2010.

(30) Foreign Application Priority Data

Dec. 2, 2009    (JP) .................................. 2009-274050

(51) Int. Cl.
*G06F 9/455*    (2006.01)

(52) U.S. Cl.
USPC .................................................. 718/1

(58) Field of Classification Search ................ None
See application file for complete search history.

(56) References Cited

U.S. PATENT DOCUMENTS

| | | | |
|---|---|---|---|
| 7,814,363 B2 | 10/2010 | Hatta et al. | |
| 2008/0301487 A1* | 12/2008 | Hatta et al. | 714/3 |
| 2010/0031257 A1 | 2/2010 | Ikegaya et al. | |
| 2010/0169537 A1* | 7/2010 | Nelson | 711/6 |

FOREIGN PATENT DOCUMENTS

| | | |
|---|---|---|
| JP | 2008-217302 A | 9/2008 |
| JP | 2010-33403 A | 2/2010 |

OTHER PUBLICATIONS

Bradford et al., "Live Wide-Area Migration of Virtual Machines Including Local Persistent State", Proceedings of the 3rd International Conference on Virtual Execution Environments, Jun. 13-15, 2007, San Diego, CA, USA, (Jun. 13, 2007) pp. 169-179, XP002577600, ISBN: 978-1-59593-630-1.
Cui et al., "Enhancing Reliability for Virtual Machines via Continual Migration", (ICPADS), 2009 15th International Conference on Parallel and Distributed Systems, IEEE, Piscataway, NJ, USA, (Dec. 8, 2009), pp. 937-942, XP031616991, ISBN: 978-1-4244-5788-5.
Harding et al., "IBM System p Live Partition Mobility", Redbooks, IBM, pp. 164-169, Oct. 2007.

\* cited by examiner

*Primary Examiner* — Gregory Kessler
(74) *Attorney, Agent, or Firm* — Mattingly & Malur, PC

(57) ABSTRACT

In a system including a plurality of physical machines to execute virtual machines (VM1, VM2), migration virtual machine information and definition information are saved in a physical machine executing a virtual machine (VM1) to be migrated and a storage of a physical machine as a migration destination. During the migration of the virtual machine, machine identification information of a migration partner, unique information assigned to the virtual machine, and information indicating whether the physical machine executing the processing is a migration-source or migration-destination physical machine are saved in a migration information storage area. A migration recovery section examines information stored in a definition information storage area and a migration information storage area to determine a recovery procedure to restore the virtual machine.

9 Claims, 12 Drawing Sheets

MIGRATION VM UNIQUE INFORMATION 500

| PARTNER MACHINE IDENTIFICATION INFORMATION | VM NAME | UUID | VIRTUAL NIC | VIRTUAL HBA | MIGRATION TYPE |
|---|---|---|---|---|---|
| — | VM 1 | UUID 1 | PORT N1-MAC1 | PORT F1-WWN1 | MIGRATION SOURCE |
| VIRTUALIZER ADDRESS 2 | VM 2 | UUID 2 | PORT N2-MAC2 | PORT F2-WWN2 | MIGRATION DESTINATION |

510　520　530　540　550　560

"VIRTUAL MACHINE MIGRATION MANAGING METHOD, COMPUTER USING THE METHOD, VIRTUALIZER USING THE METHOD AND COMPUTER SYSTEM USING THE METHOD

INCORPORATION BY REFERENCE

The present application is a continuation of U.S. patent application Ser. No. 12/957,568, Dec. 1, 2010 which claims priority from Japanese application JP2009-274050 filed on Dec. 2, 2009, the content of which is hereby incorporated by reference into this application.

BACKGROUND OF THE INVENTION

The present invention relates to a technique for use with a system including a plurality of physical machines (real machines) capable of executing virtual machines, and in particular, to a method of migrating a virtual machine from a first physical machine to a second physical machine, a computer using the method, a virtualizer using the method, and a computer system using the method.

According to the virtual technique, it is possible to increase utilization efficiency of hardware resources such as processors, memories, and input and output units. It is also possible to change allocation of such resources to collect a plurality of jobs or applications on one physical machine. Additionally, the virtual technique realizes a function in which a virtual machine being executed on a first physical machine is migrated to a second physical machine to be executed on a virtualizing section or a virtualizer of the second machine.

In a migration function of a virtual machine, a storage and a network which are external devices accessible from two associated physical machines are prepared. Depending on cases, a virtual machine definition file is also configured as an image in the storage accessible from the physical machines.

However, in operation of such storage accessible from a plurality of physical machines, any physical machine connected to the storage is capable of referring to or updating storage volumes in the storage. This leads to a problem of security. To enhance security, there is employed a function to restrict or to control access to a storage volume in the storage and access to a network. In general, the access control is carried out by use of a name and an address of a request source unit having issued a request to access a resource, for example, by establishing a correspondence between a particular physical machine and a storage volume in an associated storage.

In access control of a virtual machine, it is possible to establish a correspondence between the virtual machine and a resource by use of a name and an address assigned to the virtual machine. When the virtual machine is migrated, the name and the address are moved at the same time in general. It is hence possible to retain the access control without changing the setting of the switches and the storages in association with the migration of the virtual machine.

On the other hand, when moving a virtual machine from a first physical machine as a migration source to a second physical machine as a migration destination, the virtual machine definition file is not shared between virtualizers respectively of the first and second physical machines in some cases. In a situation in which a file including information to define a configuration of the virtual machine is individually managed by a virtualizer of the physical machine to execute the virtual machine, a managing server creates the virtual machine definition file in the migration destination. After moving the virtual machine to the migration destination, the managing server deletes the virtual machine definition file from the migration source.

JP-A-2008-217302 (Patent Document 1) describes a technique in which when the virtualizer differs in its kind between a migration source and a migration destination, a setting file required for operation of the virtual machine is copied and the copied file is converted according to the virtualizer of the migration destination. To suppress downtime during the virtual machine migration, the virtualizer includes a collecting section to collect information of configurations of virtual machines. In response to an instruction from a managing server, the virtualizer collects, converts, and updates the information.

As above, the managing server is employed to simplify the operation required for the virtual machine migration and to monitor the migration state. In a situation in which the managing server is not available or communication between the managing server and the virtual machines is disconnected, the migration of the virtual machine is suspended and then the virtual machine is restored to the state before the migration in general.

A technique in which when migration of a virtual machine is started, the state of migration is monitored is described in pages 164 to 169 of Red Book "IBM System p Live Partition Mobility" published in October 2007 from IBM. If the migration fails, a managing server carried out a recovery operation. To prevent two physical machines from simultaneously executing a virtual machine assigned with the same name and the same address, the recovery function of the managing server appropriately restores the configuration of the virtual machine to the state before migration or the state after migration.

SUMMARY OF THE INVENTION

According to the prior art, in an operation to move a virtual machine executing a job from a first physical machine to a second physical machine, the managing server executes a migration procedure while communicating with the physical machine as a migration source and the physical machine as a migration destination. The virtualizer on each of the physical machines processes a request from the managing server to appropriately transfer the setting of access control between the physical machines. It is hence possible to migrate the virtual machine to the second physical machine as the migration destination without deteriorating security.

However, if the managing server fails or if the communication between the managing server and the virtualizers is disconnected before the virtual machine is completely migrated, the request cannot be issued to the virtualizer and the migration processing is suspended. Due to suspension of the migration processing, the function of access control for an external device as an access target of the virtual machine fails in some cases. This takes place, for example, when the migration processing is suspended after the name and the address to be used for the access control are copied onto the migration destination and the same name and the same address remain in the migration source. Each of the migration source and the destination has the same name and is hence capable of accessing the same storage volume. Therefore, it is likely that the contents of the storage volume are destroyed.

To prevent such storage destruction, there is prepared a recovery function to be executed after the virtual machine migration is suspended. According to the recovery function, the managing server examines the states of the migration-source and migration-destination virtual machines. Depending on a result of the examination, the managing server restores the states of the virtual machines to those before migration and then executes the virtual machine on the physical machine of the migration source. Or, the managing server restores the states of the virtual machines to the advanced states thereof after migration and then deletes the information of the virtual machine definition from the physical machine as the migration source.

However, if the managing server is not restored or if the communication from the managing server to the physical machine of the migration source or destination is not restored, the recovery processing cannot be executed. If the system waits for completion of the recovery job or if the virtual machine definition is once erased and is then created again for the recovery, the downtime due to the migration suspension is disadvantageously elongated.

The elongation of the downtime due to failure of the managing server indicates that when the physical machine executing the managing server is less reliable than the physical machine executing the virtual machine, the reliability for virtual machine migration of the system is lowered to the level of reliability of the physical machine executing the managing server. That is, to avoid the disadvantage, it is required to prepare a managing server having higher reliability when a virtual machine is migrated from a first physical machine to a second physical machine. This results in a problem to be solved.

To solve various problems taking place during the migration of a virtual machine, it is required to migrate the virtual machine independently of the managing server.

It is therefore an object of the present invention to provide a computer system capable of moving a virtual machine from a first physical machine to a second physical machine independently of the managing server.

To achieve the object, there are provided a method of managing migration of a virtual machine and a computer system employing the method according to the present invention wherein a first real machine is a migration source to migrate a virtual machine being executed on the first real machine to a second real machine. The first real machine includes a first virtualizer and a first storage to store unique information of the virtual machine to be executed by the first virtualizer. The second real machine is a migration destination to which a virtual machine being executed on the first real machine is migrated from the first real machine. The second real machine includes a second virtualizer and a second storage to store unique information of the virtual machine to be executed by the second virtualizer.

When a migration request of the virtual machine is received, the first virtualizer sends, to the second virtualizer, first unique information as unique information of the virtual machine as a target of the migration request. The second virtualizer receives the first unique information from the first virtualizer, creates a virtual machine on the second virtualizer based on the first unique information; saves the first unique information and second unique information as unique information of the virtual machine created based on the first unique information, as migration virtual machine information of the second real machine in the second storage, and sends the second unique information to the first virtualizer.

The first virtualizer receives the second unique information and then saves, in the first storage, the first unique information and the second unique information received from the second virtualizer, as migration virtual machine information of the first real machine.

According to the present invention, a virtual machine can be migrated independently of the managing server. During the migration of the virtual machine, if the operation of the virtual machine is suspended, it is possible to restore the virtual machine independently of the managing server.

Other objects, features and advantages of the invention will become apparent from the following description of the embodiments of the invention taken in conjunction with the accompanying drawings.

DESCRIPTION OF THE EMBODIMENTS

Figure 1:
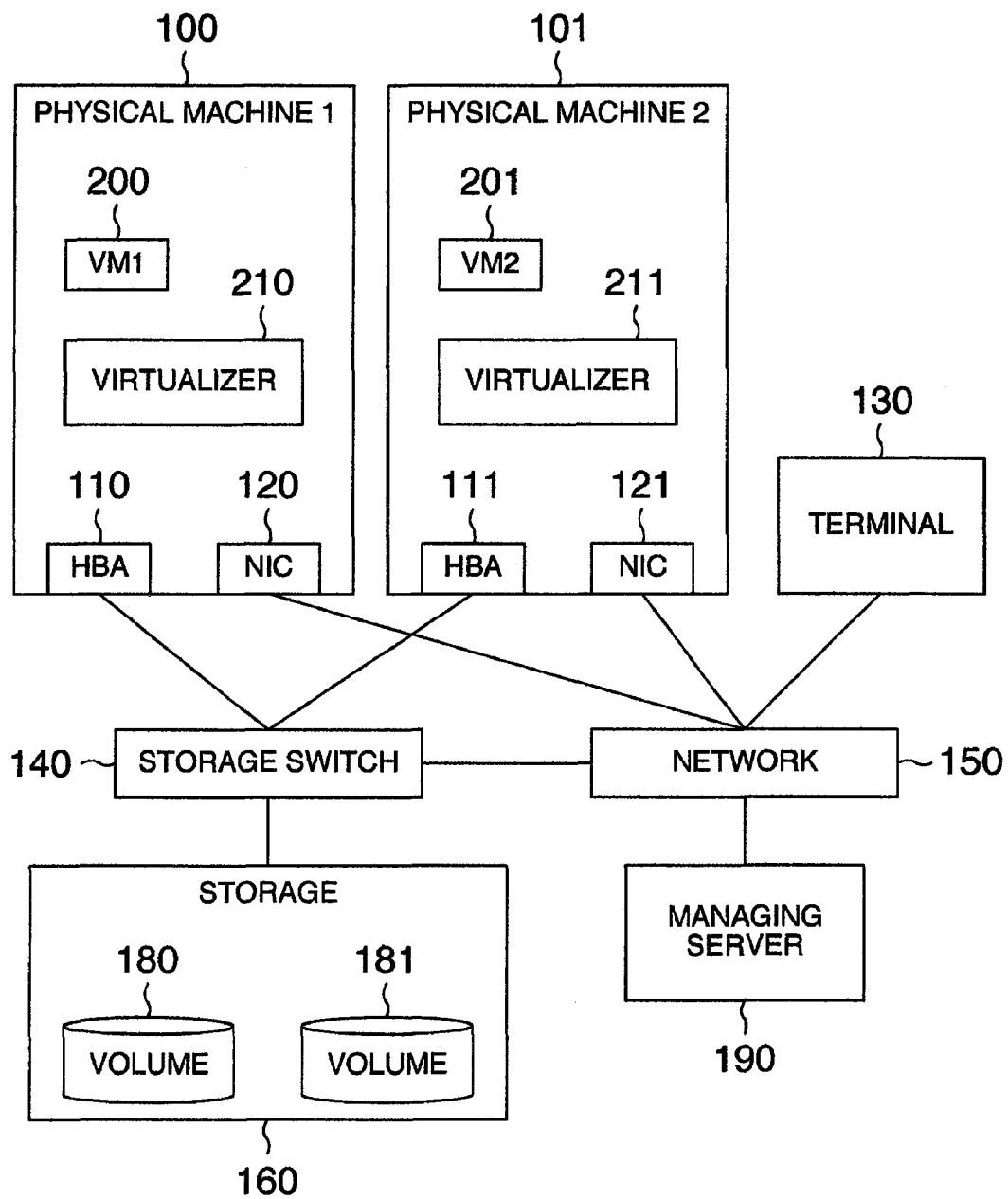
FIG. 1 is a block diagram showing structure of a computer system in an embodiment of the present invention.

Referring now to the drawings, description will be given of embodiments according to the present invention.

Embodiment 1

Description will now be given of a first embodiment according to the present invention. In conjunction with the first embodiment associated with a system including virtualizers, description will be given of a configuration of a device for and a method of migrating a Virtual Machine (VM) through communication between virtualizers.

FIG. 1 shows a configuration of a computer system in the first embodiment of the present invention.

The computer system of FIG. 1 includes a physical machine 1 (100), a physical machine 2 (101), and a storage 160 as well as a storage switch 140 and a network 150, which establish connections between these constituent components. The network 150 is connected to a terminal 130 to conduct various setting operations for the computer system.

The physical machine 1 (100) is linked via a fibre-channel Host Bus Adapter (HBA) 110 to the storage switch 140 and is connected via a Network Interface Card (NIC) 120 to the network 150. Similarly, the physical machine 2 (101) is linked via a fibre-channel HBA 111 to the storage switch 140 and is connected via an NIC 121 to the network 150. The storage switch 140 and the terminal 130 are also coupled with the network 150.

The storage 160 is assigned with volumes 180 and 181, which are exclusively used by respective physical machines.

Each of the HBAs 110 and 111 is assigned with a World Wide Name (WWN) unique thereto. Each of the physical machines 1 and 2 (100 and 200) can access the storage 160 by use of the WWN.

Figures 3, 4:
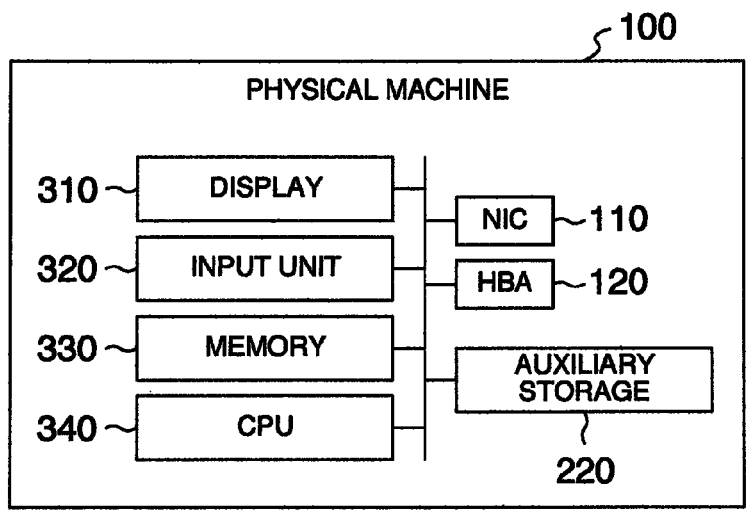
FIG. 3 is a block diagram showing structure of a physical machine in an embodiment of the present invention.
FIG. 4 is a diagram showing a data layout of virtual machine definition information kept in a physical machine according to an embodiment of the present invention.

Each of the physical machines 1 and 2 (100 and 200) is a physical machine of a general configuration as shown in FIG. 3. FIG. 3 shows a configuration of the physical machine 1. The physical machine 1 (100) includes a display 310 to display states of physical machines and program execution results, an input unit 320 to supply programs with data, a memory 330 to keep application programs and data, a Central Processing Unit (CPU) to execute virtualizer programs and application programs loaded in the memory 330, an HBA 110, an NIC 120, and an auxiliary storage 220. The constituent components are connected via a bus to each other. For each of the physical machines 1 and 2 (100 and 200), it is possible to employ a blade of a blade system. The physical machines 1 and 2 (100 and 200) may be installed at locations apart from each other.

Figure 14:
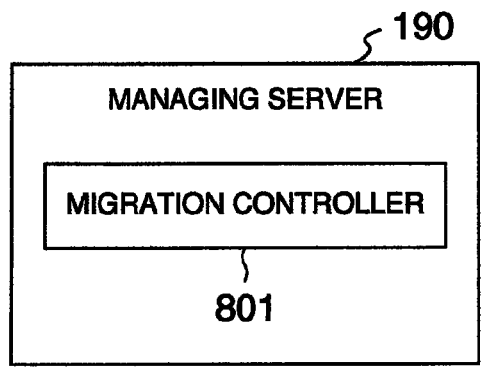
FIG. 14 is a diagram showing a constituent component of a managing server.

The terminal 130 may be a physical machine similar in structure to the physical machine 1 (100). Or, a blade may be allocated as the terminal 130. However, the HBA and the auxiliary storage may be dispensed with. The managing server 190 may be a physical machine similar in structure to the physical machine 1 (100), but the HBA and the auxiliary storage may be dispensed with. In FIG. 14, the managing server 190 includes a migration controller 801.

In FIG. 1, the physical machines 1 and 2 (100 and 200) respectively include virtualizers 210 and 211, which conduct virtualization. In the physical machine 1 (100), one virtual machine VM1 (200) operates under control of the virtualizer 210.

Figure 2:
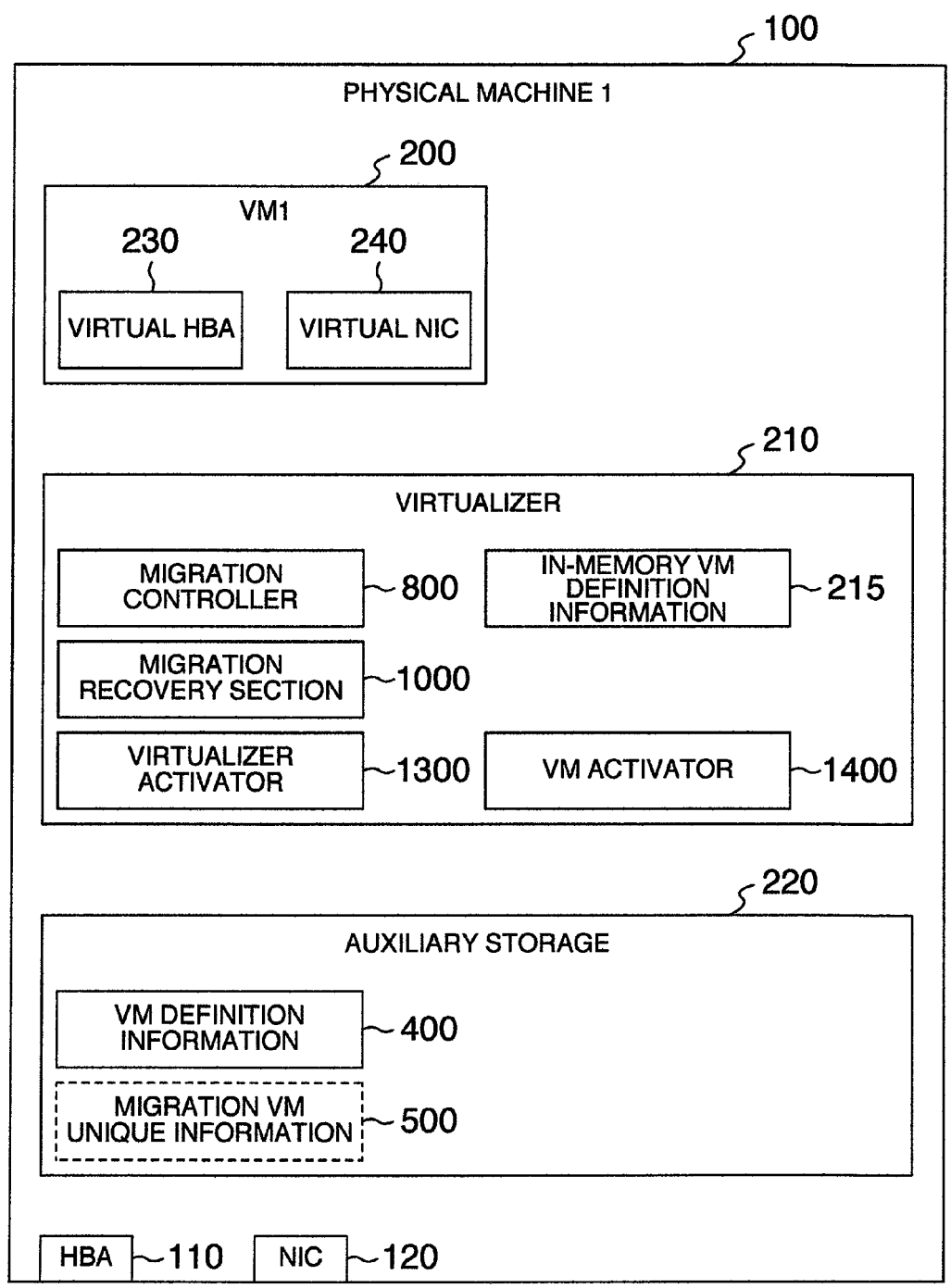
FIG. 2 is a diagram showing constituent components of a virtualizer and an auxiliary storage in an embodiment of the present invention.

FIG. 2 shows constituent components of the physical machine 1 (100) including the virtualizer 210. The physical machine 1 (100) as a computer system is similar in structure to the physical machine 1 (100) shown in FIG. 1.

The virtual machine VM1 (200) includes a virtual HBA 230 which is a virtual HBA created by the virtualizer 210 and a virtual NIC 240 which is a virtual NIC 240 created by the virtualizer 210. The virtualizer 210 emulates operation for the virtual HBA and the virtual NIC. The virtual HBA 230 includes a port assigned with a unique WWN. The virtual NIC 240 includes a port assigned with a unique MAC address. The WWN and the MAC address are employed as unique information pieces for an external device to identify a virtual adapter of a virtual machine.

It is possible that an operation request for the virtualizer is inputted from the terminal 130 to operate the virtual machine by use of data in the auxiliary storage 220 to output operation results to the terminal 130. In the virtualizer 210, a virtualizer activator 1300 executes processing to activate the virtualizer 210 to input a VM definition information table 400 from the auxiliary storage 220 to the in-memory VM definition information 215. Also, a VM activator 1400 executes VM activation processing to activate the virtual machine.

FIG. 4 shows a configuration of the VM definition information table 400. A VM number field 410 keeps a serial VM number defined in the virtualizer. A VM name field 420 keeps a nickname of the virtual machine. A UUID field 430 keeps a logical identifier to uniquely identify the VM in the system. A virtual NIC field 440 keeps port information and a unique MAC address to identify a virtual NIC of the VM. A virtual HBA field 450 keeps port information and a unique WWN to identify a virtual HBA of the VM. A field 460 keeps, for example, a memory size assigned to the VM. The VM definition information table 400 is created as VM configuration managing information to be stored in the auxiliary storage 220. However, data required to create the VM definition information table 400 may be obtained in any appropriate method.

In FIG. 4 showing the configuration managing information for VM1 200, the fields 410, 420, and 430 respectively keep a VM number 1, a VM name VM1, and UUID1 as a VM logical identifier. The field 440 keeps information pieces including port N1 to identify the virtual NIC 240 and an MAC address MAC1 assigned by the virtualizer 210 to the virtual NIC 240. The field 440 keeps information pieces including port N1 to identify the virtual NIC 240 and an MAC address MAC1 assigned by the virtualizer 210 to the virtual NIC 240. The field 450 keeps information pieces including port N1 to identify the virtual HBA 230 and WWN1 which is a WWN assigned by the virtualizer 210 to the virtual HBA 230.

To migrate a virtual machine from a first physical machine to a second physical machine, the virtualizer 210 of the present embodiment includes a migration controller 800 and a migration recovery section 1000. The auxiliary storage 220 stores VM definition information 400 and migration VM unique information 500. The migration of a virtual machine to a second physical machine means that the VM configuration information kept in the VM definition information table 400 is moved to the second physical machine and an external device recognizes a virtual machine in the migration destination by use of the VM logical identifier before the migration. Similarly, the virtual HBA of the virtual machine in the migration destination is identified by use of the WWN assigned to the virtual HBA of the virtual machine before migration and the virtual NIC is recognized by use of the MAC address assigned to the virtual NIC of the VM before migration. The operating system running on the virtual machine before migration is transferred to the virtual machine of the migration destination.

Figure 8:
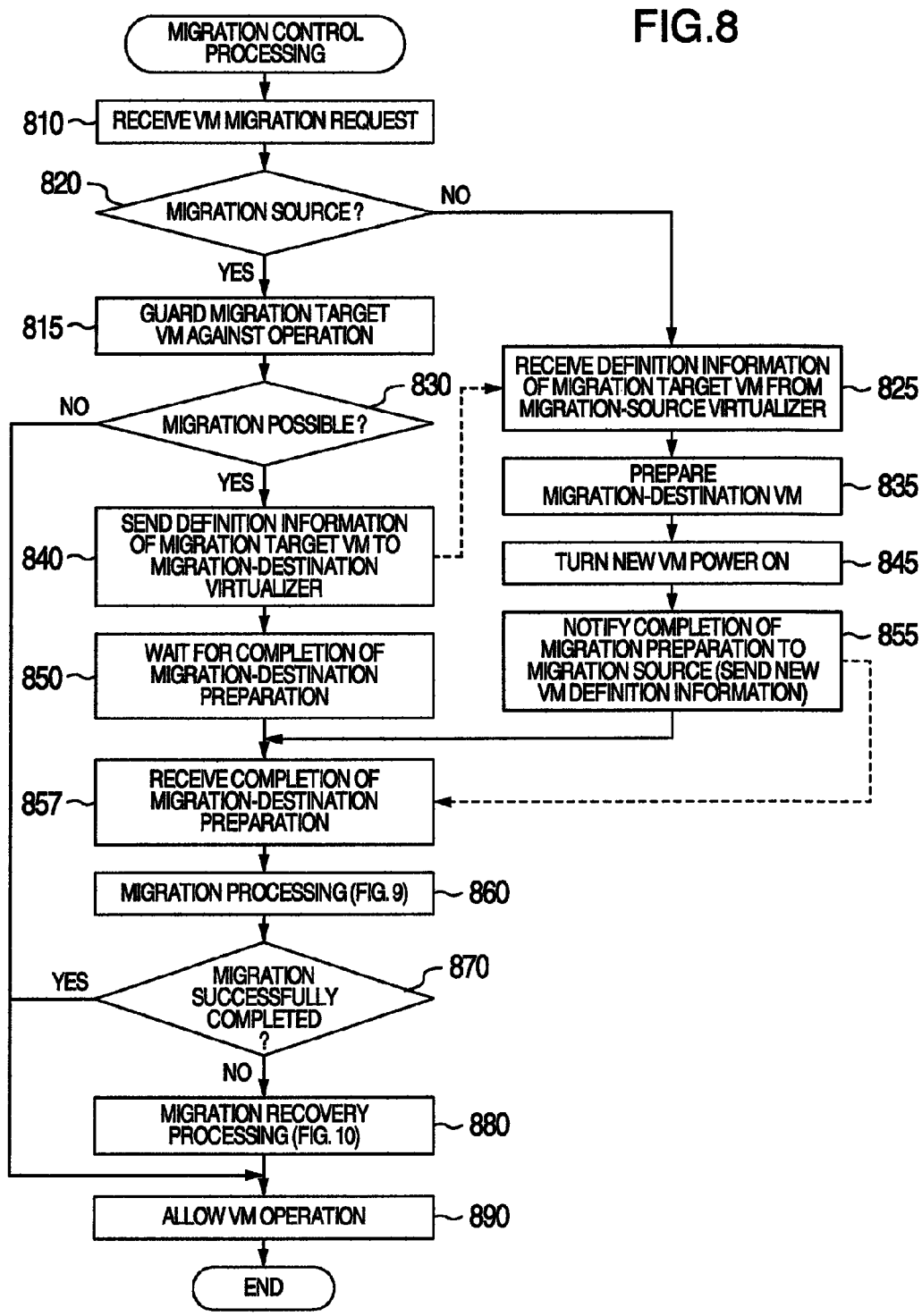
FIG. 8 is a flowchart showing a control procedure for a virtualizer to migrate a virtual machine from a first physical machine to a second physical machine in an embodiment of the present invention.

Description will now be given of a procedure in which the virtualizer 210 moves, in response to an indication received from the terminal 130, the virtual machine to a second physical machine. FIG. 8 is a flowchart of operation to be executed by the migration controller 800 in the virtualizer 210. In FIG. 8, broken lines indicate communication of information (this also applies to the description below).

In step 810, a VM migration request is received. The request source is the terminal 130 or the virtualizer of the second physical machine. Additionally, the migration controller 800 receives information pieces respectively indicating a virtualizer address of the migration-source machine, a migration target virtual machine, and a virtualizer address of the migration-destination machine. In this example, VM1 (200) is moved from the physical machine 1 (100) to the physical machine 2 (101).

In step 815, to prevent the terminal 130 and any other physical machine from handling the migration target virtual machine, the migration target VM is guarded against such operation.

In step 820, a check is made to determine whether or not this processing is being executed by the migration-source machine (whether or not the running machine is the migration-source virtual machine). If the processing is being executed by the migration-source machine, control goes to step 830.

Figure 15:
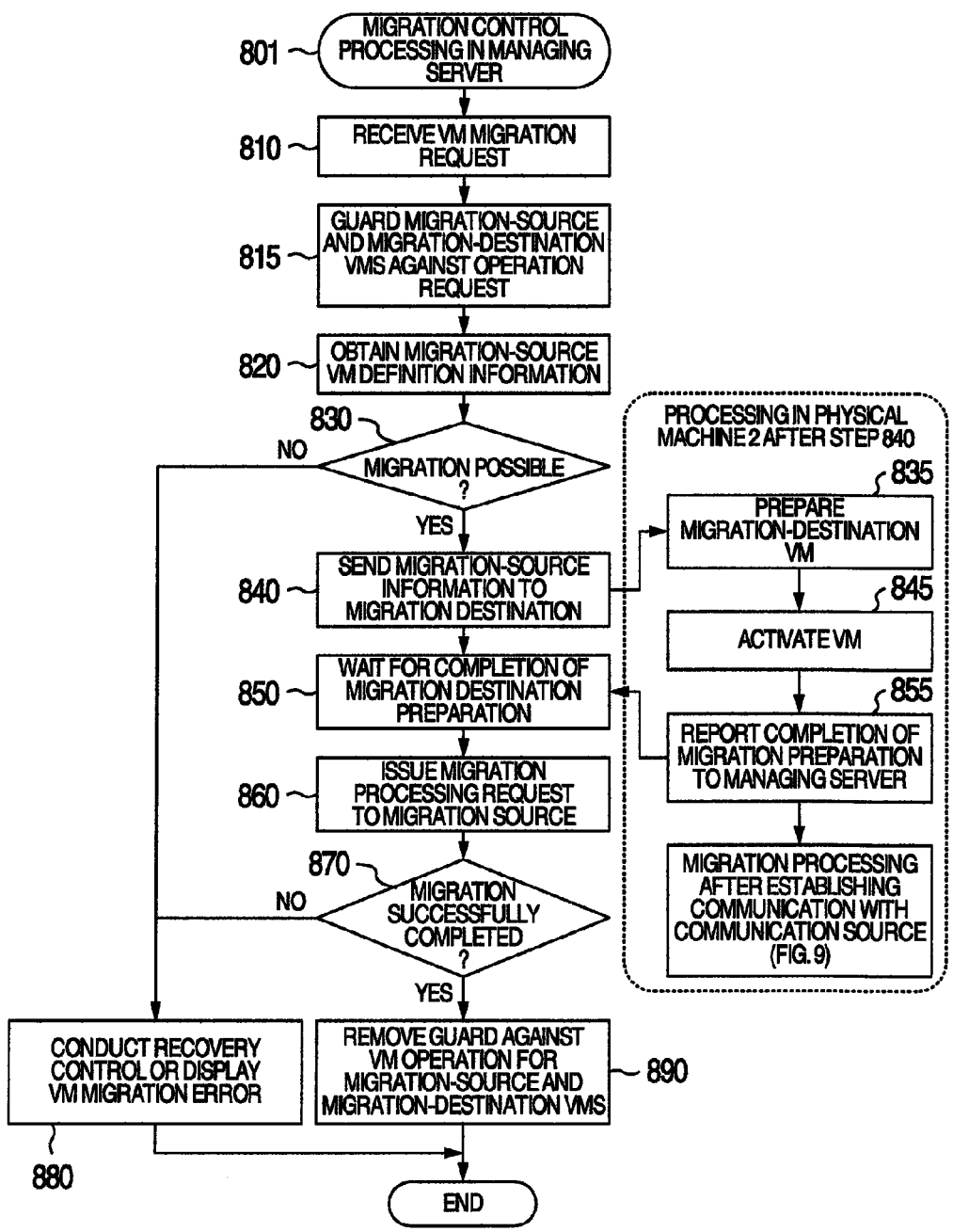
FIG. 15 is a flowchart showing a conventional control procedure to move a virtual machine from a first physical machine to a second physical machine in an embodiment of the present invention.

In the prior art, the managing server is in operation. When the managing server 190 executes the processing, a migration controller 801 of FIG. 14 executes processing in a procedure shown in FIG. 15. In step 820, information of the definition of the migration-source virtual machine (VM) is obtained from the physical machine 1 (100). In step 840, the managing server 190 passes the definition information of the migration-source VM to the physical machine 2 (101) as the migration destination. In step 855 in the physical machine 2 (101), completion of preparation for the migration is notified to the managing server 190. Thereafter, the VM migration processing is executed between the virtualizers respectively of the migration source and destination. When the VM migration processing is completed, the managing server 190 receives a notification of the completion of the VM migration processing. If it is determined in step 870 that the migration processing has failed, control goes to step 880. In step 880, the managing server 190 indicates recovery processing to the virtualizers of the physical machines 1 and 2 (100 and 101) or presents the error in the VM migration on the display thereof. If the managing server 190 is not operable in this situation, the result of the VM migration is unknown, and recovery control fails. After the managing server 190 is operable again, it is required that the virtual machine is returned to the physical machine 1 as the migration source. If the VM information of the virtual machine as the migration target remains in the physical machine 2, forced recovery is to be executed to delete the VM information therefrom.

In step 830, a check is made to determine whether or not the migration-source VM is movable to a second physical machine. This is carried out by determining, for example, whether or not the specified VM (the migration target VM) is present or whether or not the device of the VM is a device which is not available for the VM migration. If it is determined that the VM is movable, control goes to step 840. Otherwise, control goes to step 890. Processing of step 890 will be described later.

In step 840, address information of the virtualizer of the migration-source machine and VM definition information of the migration target VM are sent to the address of the virtualizer of the migration-destination machine to request activation of the VM migration. The VM definition information includes information pieces respectively of the fields 410 to 460 for the target VM of the VM definition information table 400.

In step 850, the migration controller 800 waits for completion of the migration preparation by the virtualizer of the migration-destination machine. If a response received from the migration-destination machine indicates that the migration-destination VM cannot be prepared, not shown, the migration controller 800 assumes that the VM migration is not possible, and then control goes to step 890.

If it is determined in step 820 that the processing is being executed in other than the migration-source machine, it is possible to assume that the processing is being executed in the migration-destination machine and control goes to step 825. Step 825 is disposed to receive the VM definition information of the migration target VM sent from the migration-source machine in step 840. In step 835, according to the VM definition information thus received, the migration controller 800 creates a new virtual machine including a virtual HBA and a virtual NIC like the virtual machine in the migration source. For the new virtual machine, a new entry is added to the in-memory definition information 215 in the virtualizer 211 of the migration-destination physical machine 2 (101), and information pieces respectively of fields 420 to 460 are designated. The VM name in the field 420 and the memory size information in the field 460 are designated according to the associated definition information pieces of the migration-source VM. The fields 430 to 450 keep values assigned to the new VM independently of the migration-source VM.

In step 845, the new virtual machine is activated. Specifically, the virtualizer 211 emulates an operation in which the virtualizer 211 turns power of the virtual machine on, but does not boot the operating system.

In step 855, completion of the preparation for the migration-destination VM (new VM) is notified to the migration-source virtualizer. However, if the migration-destination VM cannot be prepared due to, for example, insufficient resources of the migration-destination machine, it is notified that the VM migration is not possible. When the migration-source virtualizer receives the notification, control goes to step 890, not to step 860.

As above, the preparation for the VM migration to the second physical machine has been finished. Description will now be given of a procedure beginning at step 860.

After the completion of migration preparation is received in step 857, control goes to step 860. Step 860 is migration processing in which memory data and information of VM registers of the migration target VM are copied onto the migration-destination VM and the operating system is transferred to the migration-destination VM. This will be described later in detail by referring to FIG. 9.

In step 870, a result of the migration processing of step 860 is examined. If the migration processing is terminated in failure, control goes to step 880 to execute migration recovery processing. In the migration recovery processing, a check is made at reception of suspension of the VM migration to determine whether the VM is to be returned to the migration source or the VM migration is to be advanced beginning at the suspended point. The processing will be described later in detail by referring to FIG. 10.

In step 890, since the VM migration is completed, the restriction imposed on the operation for the VM is released. Specifically, the guard of the VM set in step 815 against operations from the terminal 130 and any other physical machine is removed. A result indicating that the migration has been completed or the migration is not possible is returned to the terminal 130 as a request source and then the processing is terminated.

Figure 9:
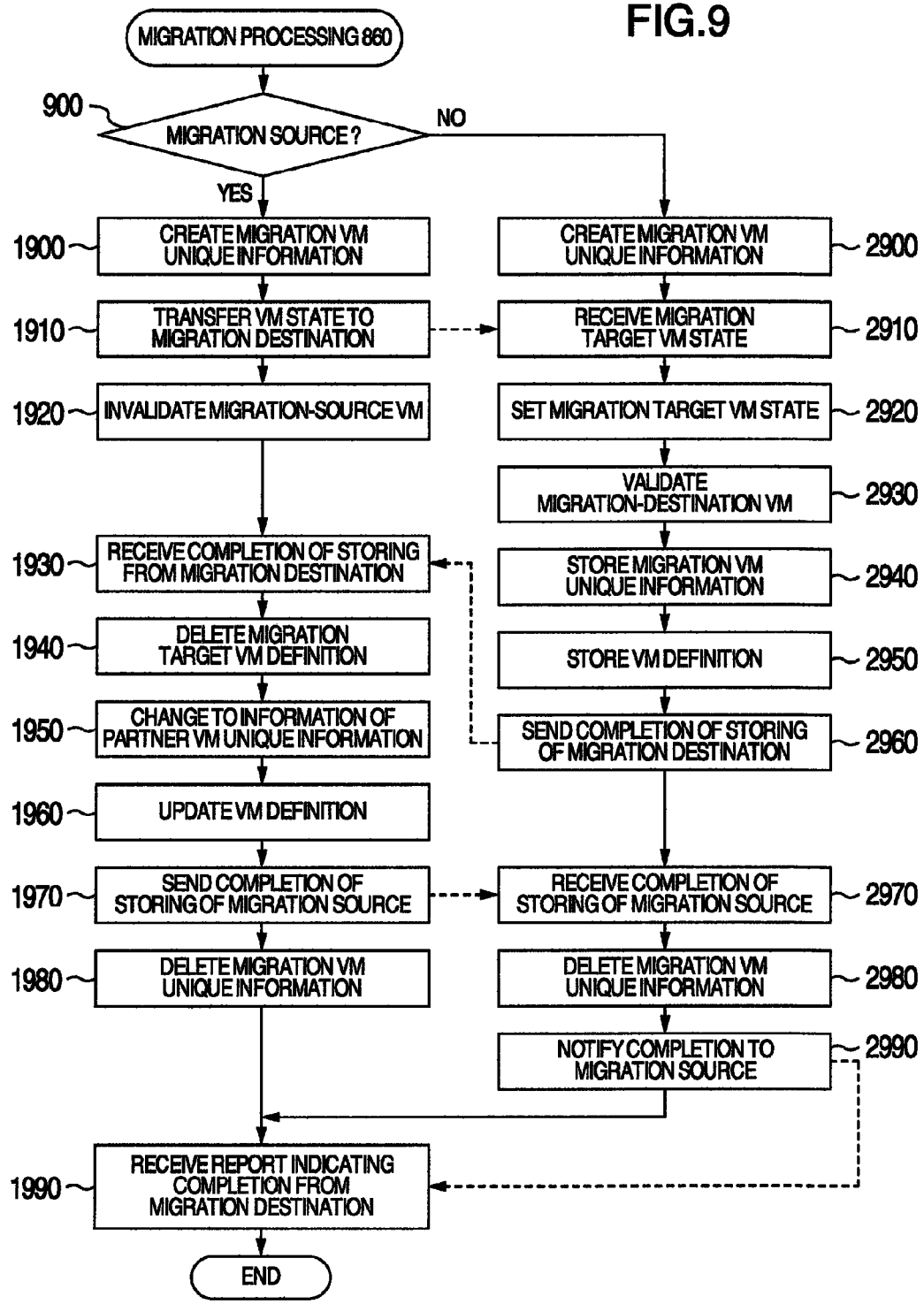
FIG. 9 is a flowchart showing a control procedure for a virtualizer to move data and definition information of a virtual machine from a first physical machine to a second physical machine in an embodiment of the present invention.

Description will be given of the VM migration procedure of step 860 by referring to the flowchart shown in FIG. 9.

In step 900, a check is made to determine whether or not the processing is being executed by the virtualizer of the migration-source machine. If it is determined that the processing is being executed by the virtualizer of the migration-source machine, control goes to step 1900. If it is determined that the processing is being executed by the virtualizer of the migration-destination machine, control goes to step 2900.

Description will be given of migration processing in the migration-source machine.

Figures 5, 6:
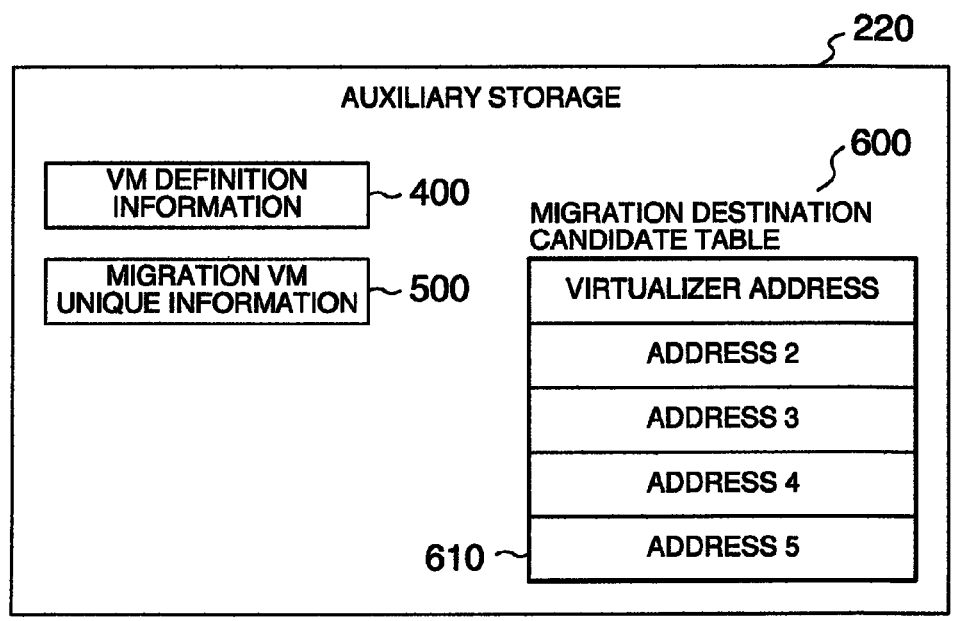
FIG. 5 is a diagram showing a data layout of unique information of a migration virtual machine kept in a physical machine according to an embodiment of the present invention.
FIG. 6 is a diagram showing a data layout of migration destination candidate information kept in a physical machine according to a second embodiment of the present invention.

In step 1900, unique information allocated to the migration target VM is stored in the auxiliary storage 220 in the form of the migration VM unique information table 500. The information table 500 is used at suspension of the VM migration by the virtualizer to identify the VM being migrated. Referring to FIG. 5, description will be given of the data layout of the migration VM unique information table 500.

The migration VM unique information table 500 includes an upper row to keep unique information of the VM under consideration and a lower row to keep VM unique information of a virtual machine as a communicating partner. Each row includes fields 510 to 560. The field 510 keeps an address of a virtualizer to be employed for communication with a virtual machine as a communicating partner. The field 520 keeps a VM name. The field 530 keeps a UUID as a VM logical identifier. The field 540 keeps information pieces which respectively indicate a port to identify the virtual NIC 240 and an MAC address assigned by the virtualizer to the virtual NIC 240. The field 550 keeps information pieces respectively indicating a port to identify the virtual HBA 230 and a WWN assigned by the virtualizer to the virtual HBA 230. The field 560 keeps information indicating a migration-source VM or a migration-destination VM. If the VM under consideration is a migration source, the upper row keeps information for a migration source and the lower row keeps information for a migration destination.

In step 1910, a VM state of the migration target VM is sent to the migration-destination virtualizer. The VM state includes data in the VM memory and data in VM virtual registers. By setting these items to the migration-destination VM, it is possible for the migration-destination VM to continuously execute the processing of the operating system employed in the migration-source VM.

In step 1920, the migration target VM is invalidated. That is, to prevent execution of the operating system in the migration target VM after the processing of the operating system is transferred to the migration-destination VM, the logical power of the migration target VM is turned off (the processing up to this point is first migration-source processing).

Thereafter, control waits for completion of an operation in which the migration-destination virtualizer stores the definition information of the migration-destination VM in the auxiliary storage 221. When a report indicating completion of the operation to store the definition information of the migration-destination VM is received from the migration-destination virtualizer in step 1930, the VM definition of the migration target VM is deleted from the migration source in step 1940. That is, the VM definition information of the migration target VM which has been migrated is deleted from the in-memory VM definition information 215.

In step 1950, the VM unique information kept secured for the migration target VM up to this point is changed to VM unique information of the migration-destination VM (transfer of the information). This is because the unique information allocated to the migration-destination VM is used in place of the unique information of the migration-source VM transferred as above. If a virtual machine is created in future, the migration-destination WWN changed and registered as above is used as a WWN assigned to the virtual HBA. Similarly, the migration-destination MAC changed and registered as above is used as an MAC address assigned to the virtual NIC.

In step 1960, the VM definition information table 400 of the auxiliary storage 220 is updated. The definition of VM1 transferred from the migration-destination VM is deleted. The WWN and the MAC address transferred from the migration-destination VM are registered to the VM definition information table 400.

In step 1970, a notification that the VM definition information of the migration-source machine has been saved in the auxiliary storage is sent to the migration-destination virtualizer.

The VM definition information has been exchanged to be saved in the migration-source and migration-destination machines. Hence, in step 1980, the migration VM unique information 500 is deleted from the auxiliary storage 220 (the processing up to this point is second migration-source processing).

When the report indicating completion of the migration is received from the migration-destination virtualizer 210 in step 1990, the VM migration processing 860 is normally terminated. The VM migration processing 860 is abnormally terminated if the processing is suspended between step 1900 and step 1990, if a report of suspension of the migration is received from the migration-destination virtualizer 210, or if failure of the migration-destination machine is detected. In step 870, failure of the migration processing is determined and control goes to step 880.

Description will now be given of the migration processing in the migration-destination virtualizer.

In step 2900, VM unique information pieces such as the WWN, the MAC address, and the UUID which are assigned to the migration-destination VM and which are registered to the in-memory VM definition information 215 are updated to the values suitable for the migration target VM.

In step 2910, information of the state of the migration target VM is received from the migration-source virtualizer 210.

When the state information of the migration target VM is completely received, control goes to step 2920 to set the memory data and the register data of the migration target VM received as above, to the migration-destination VM (new VM).

In step 2930, the migration-destination VM is validated. After step 2930, the processing of the operating system on the migration-source VM is transferred to the migration-destination VM.

In step 2940, the unique information assigned to the migration target VM is stored in the auxiliary storage 221 according to the data layout of the migration VM unique information table 500. This table is employed at suspension of the VM migration by the associated virtualizer to identify the VM being migrated.

In step 2950, the VM definition information table 400 is updated in the auxiliary storage 221. As a result, the migration-destination VM definition created as above, the VM unique information such as the UUID, the WWN, and the MAC address transferred from the migration target VM, and the memory size information substantially equal to that of the migration target VM are saved in the auxiliary storage 220.

In step 2960, a report indicating that the VM definition information of the migration-source machine has been saved in the auxiliary storage 221 is sent to the migration-source virtualizer (the processing up to this point is first migration-destination processing).

In step 2970, a report that the VM definition information has been completely exchanged to be stored in the migration-source machine is received. In step 2980, the migration VM unique information table 500 is deleted from the auxiliary storage 221.

In step 2990, completion of the VM migration processing in the migration-destination machine is notified to the migration-source virtualizer 210. If the processing is suspended between step 2900 and step 2990, the VM migration processing 860 is abnormally terminated. In step 870, failure of the migration processing is determined and control goes to step 880 (the processing up to this point is second migration-destination processing).

Figure 10:
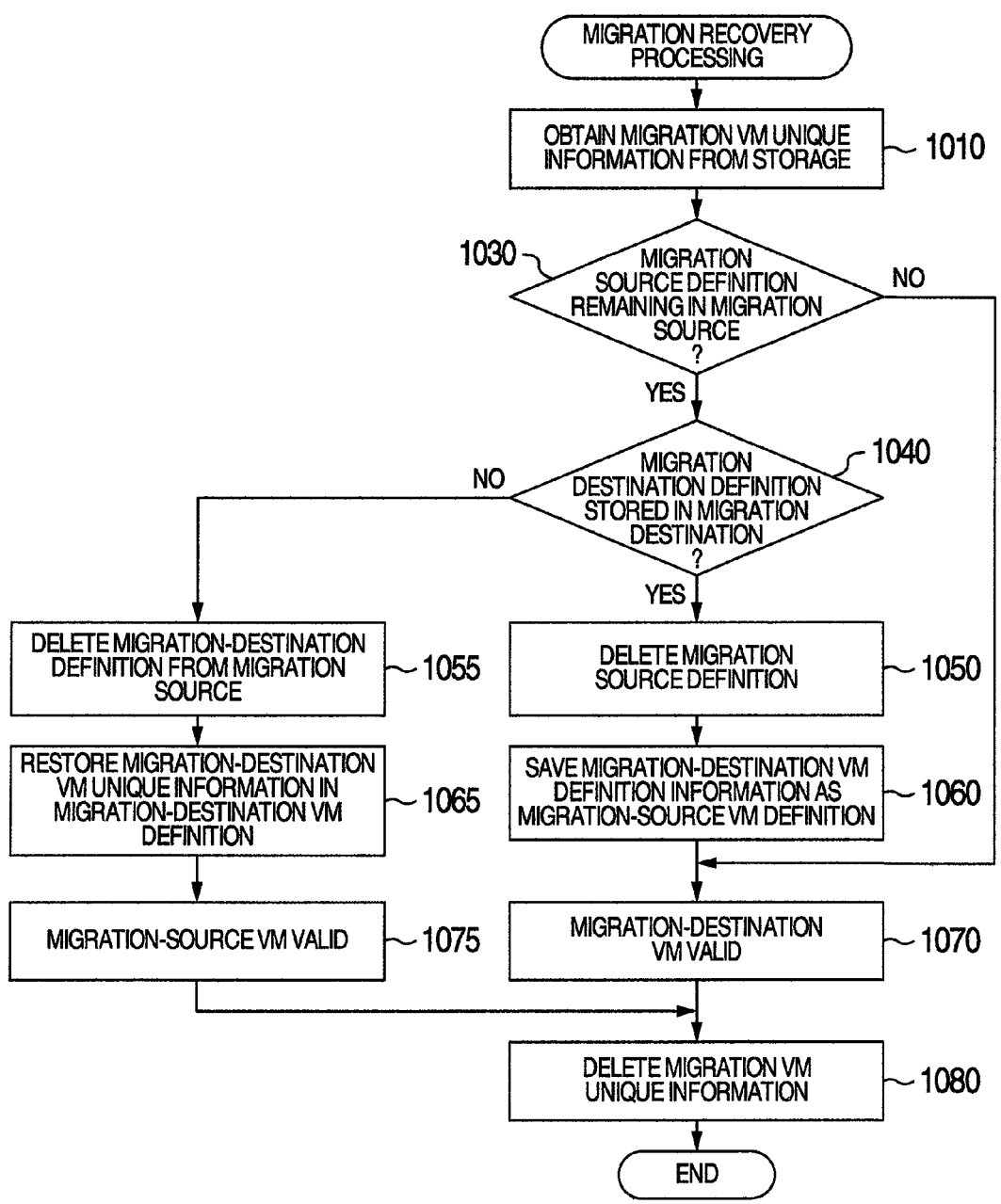
FIG. 10 is a flowchart showing a control procedure for a virtualizer to recover suspended virtual machine migration in an embodiment of the present invention.

Referring now to the flowchart shown in FIG. 10, description will be given of the migration recovery procedure of step 880. This procedure is recovery processing which cannot be accomplished by the conventional migration processing by the managing server. The migration-source virtualizer and the migration-destination virtualizer cooperate with each other such that the VM migration in a suspended state is changed to the VM migration in a migration completion state or the VM migration information is deleted from the migration-destination machine to return the VM to the migration source.

In the prior art, the migration recovery is possible only if the managing server can be activated. However, according to the present invention, the migration VM unique information table 500 is disposed in the migration-source and migration-destination machines and each of the migration-source and migration-destination virtualizers synchronously saves the VM definition information. Hence, the migration recovery is possible irrespectively of the managing server. Even if power is turned off and is then turned on in either one or both of the migration-source and migration-destination machines, the migration recovery procedure can be executed without establishing connection to the managing server. The migration-source or migration-destination machine executes the recovery processing depending on cases.

In step 1010, the migration recovery section of the real machine to conduct migration recovery accesses the auxiliary storage 220 to obtain, from the migration VM unique information table 500, the definition information of the migration-source VM, the definition information of the migration-destination VM, and the virtualizer address of the partner machine (the virtualizer address of the migration destination if the processing is being executed by the migration source; the virtualizer address of the migration source if the processing is being executed by the migration destination). In a situation wherein the migration VM unique information table 500 is absent from the auxiliary storage 220, but the virtualizer 210 keeps in its memory the information equivalent to the migration VM unique information table 500; the migration recovery section uses the definition information of the migration-source VM, the definition information of the migration-destination VM, and the virtualizer address of the partner machine which are kept in the virtualizer 210. This operation is associated with the situation in which the VM migration processing is suspended when the migration-destination machine is executing processing between step 2900 and step 2930.

However, in the migration-source machine, if the migration VM unique information is absent from the auxiliary storage 220, it is assumed that the VM migration has not been suspended. Hence, the migration recovery processing is terminated.

In the migration-destination machine, if the migration VM unique information is absent from the auxiliary storage 220 and the virtualizer 210, it is assumed that the VM migration has not been suspended. Hence, the migration recovery processing is terminated.

In step 1030, a check is made to determine whether or not the definition of the migration-source VM remains in the VM definition information table 400 stored in the auxiliary storage 220 of the migration-source machine (processing of step 1960 is finished). If the definition does not remain therein, it is assumed that the VM has been moved to the migration-destination machine and control goes to step 1070. Processing of step 1070 will be described later. If the definition remains therein, control goes to step 1040.

In step 1040, a check is made to determine whether or not the definition of the migration-destination VM is stored in the VM definition information table 400 in the auxiliary storage 221 of the migration-destination machine (processing of step 2950 is finished). If the definition has been stored therein, control goes to step 1050 to delete the definition of the migration-source VM from the in-memory VM definition information 215 of the virtualizer 210 and the auxiliary storage 220 of the migration-source machine.

In step 1060, the VM unique information kept secured for the migration-source VM up to this point is changed to the unique information of the migration-destination VM (processing is resumed in step 1950). This processing is executed to use the unique information assigned to the migration-destination VM in place of the unique information of the migration-source VM transferred to the migration-destination VM. If a virtual machine is created in future, the migration-destination WWN changed and registered as above is used as a WWN assigned to the virtual HBA. Similarly, the migration-destination MAC changed and registered as above is used as an MAC address assigned to the virtual NIC. Additionally, the VM definition information table 400 is updated in the auxiliary storage 220. In the processing, although the definition of VM1 transferred to the migration-destination VM is deleted, the WWN and the MAC address transferred to the migration-destination VM are saved in the VM definition information table 400.

Since the migration-destination VM is valid as indicated in step 1070, control goes to step 1080 to delete the migration VM unique information table 500 from the auxiliary storage and the virtualizer of the physical machine of each of the migration source and destination.

If it is determined in step 1040 that the definition of the migration-destination VM is absent from the VM definition information table 400 in the auxiliary storage 221 of the migration-destination machine, control goes to step 1055.

In step 1055, the migration-destination VM (new VM) created by the migration-destination machine is deleted from the in-memory VM definition information 215 of the migration-source virtualizer 210.

In step 1065, the VM unique information of the in-memory VM definition information is restored to the information in the state before the VM migration.

The migration-source VM is valid as indicated in step 1075, and control goes to step 1080.

The migration recovery processing 1000 is executed as above, and the migration target VM is saved only in either one of the migration-source and migration-destination machines.

Figure 12:
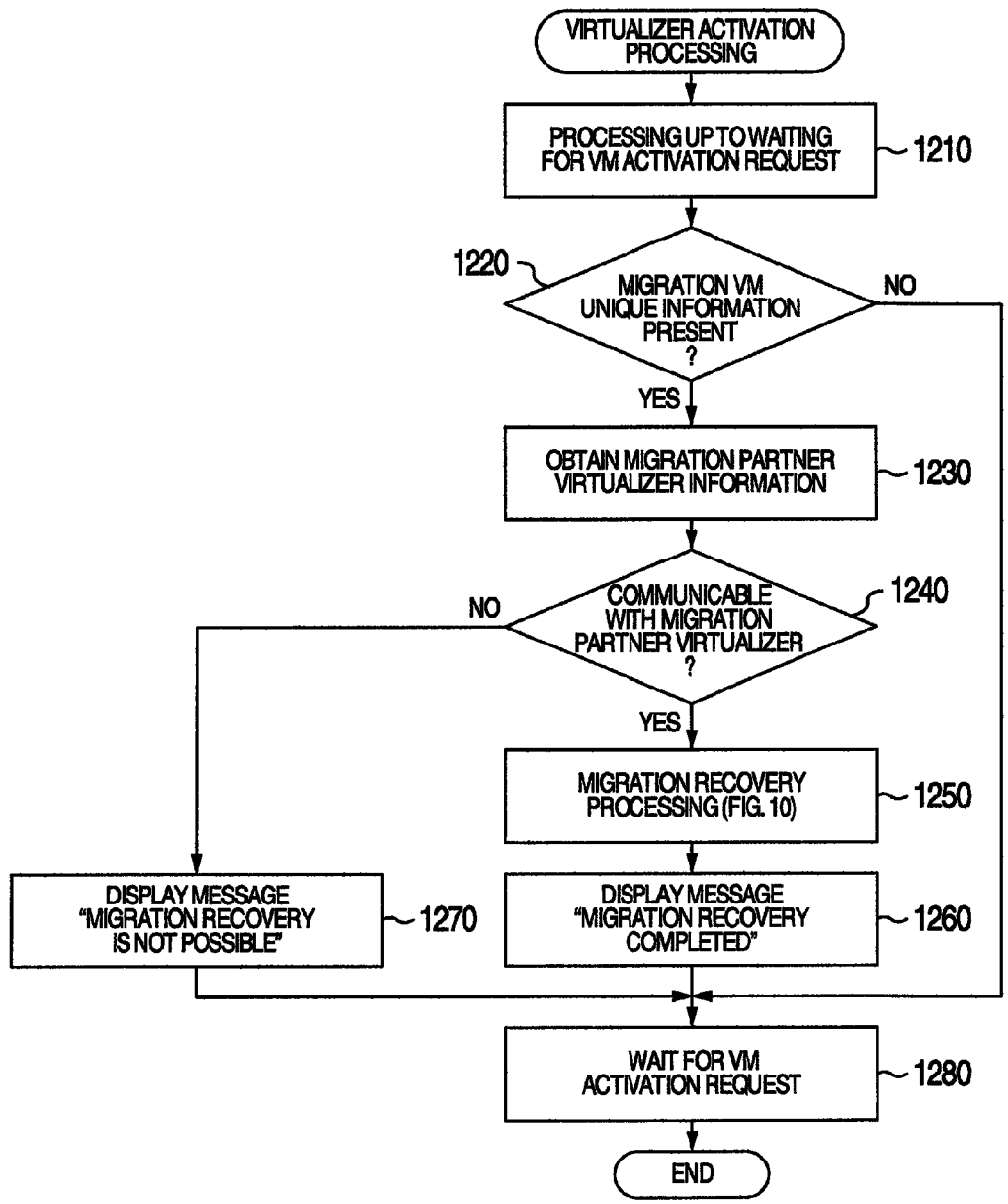
FIG. 12 is a flowchart showing a procedure to recover suspended virtual machine migration at activation of a virtual machine in an embodiment of the present invention.
Figure 13:
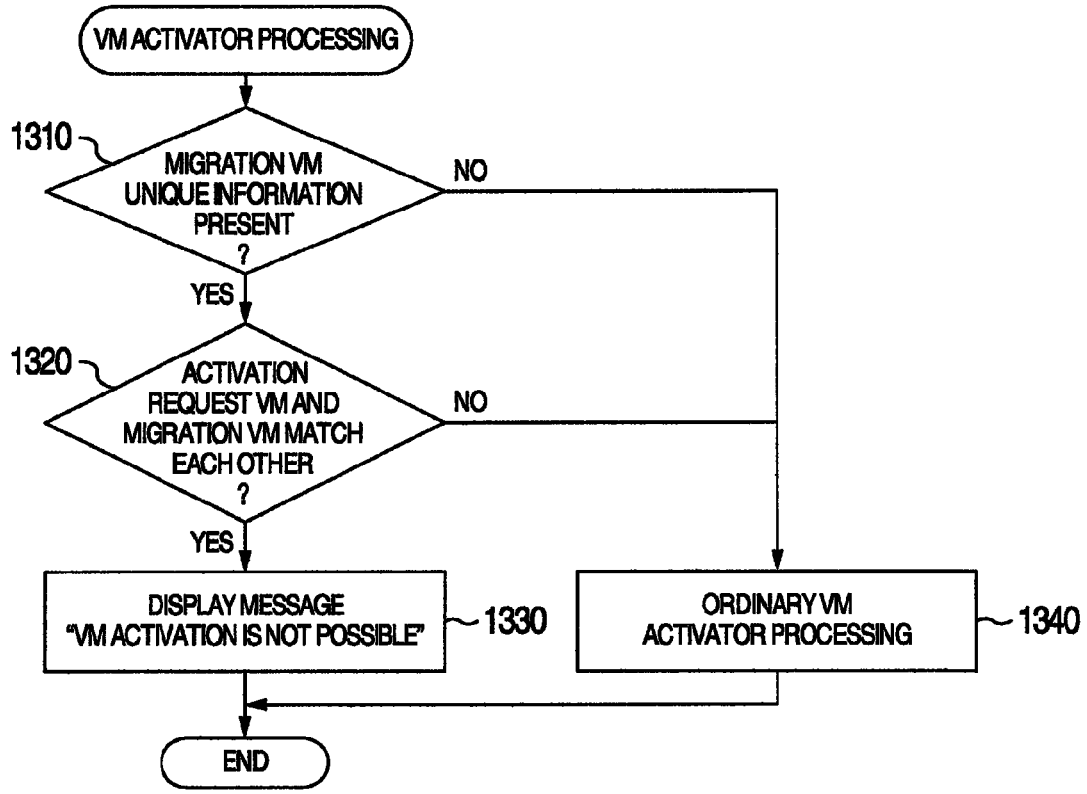
FIG. 13 is a flowchart showing a procedure to activate a virtual machine in an embodiment of the present invention.

However, if either one or both of the migration-source and migration-destination machines is or are in failure or if communication between the physical machines is disconnected, it is possible to execute the migration recovery processing only up to step 1080. Hence, at activation of a physical machine, a check is made to determine whether or not the VM migration is suspended before the physical machine is stopped, and then an attempt is made to conduct the migration recovery (FIG. 12). Also, the guard function is activated to prevent an operation in which VMs are activated under mutually same access control in the migration-source and migration-destination machines (FIG. 13).

FIG. 12 shows the processing of the virtualizer activator section 1300 in the virtualizer 210. Step 1210 is a processing procedure ranging from when the virtualizer is activated at activation of the physical machine to when a request for VM activation is about to be issued. In step 1220, a check is made to determine whether or not the migration VM unique information 500 is stored in the auxiliary storage 220. If the migration VM unique information 500 is stored therein, it is indicated that the VM migration processing is suspended and the physical machine is stopped. Hence, the migration recovery processing is required. In step 1230, the migration partner virtualizer information is obtained from the migration VM unique information 500 to make an attempt to communicate with the migration partner.

In step 1240, a check is made to determine whether or not the communication with the virtualizer as the migration partner has been successfully conducted. If the communication has been successfully conducted, control goes to step 1250 to execute the migration recovery processing shown in FIG. 10.

In step 1260, a message indicating completion of the migration recovery is presented on the display 310.

If the communication has failed, control goes to step 1270 to present a message of failure of the migration recovery on the display 310. In this way, after attempting the migration recovery during the virtualizer activation processing, control goes to step 1280 to wait for an ordinary VM activation request.

FIG. 13 shows the processing to be executed by the VM activator section 1400 of the virtualizer 210 when a VM activation request is received. In step 1310, a check is made to determine whether or not the migration VM unique information 500 is stored in the auxiliary storage 220. If it is determined that the migration VM unique information 500 is absent therefrom, control goes to step 1340 to execute the ordinary VM activation processing. Otherwise, control goes to step 1320 to determine whether or not the VM indicated by the VM activation request matches the migration VM stored in the migration VM unique information 500. If these VMs match each other, control goes to step 1330 to present on the display 310 a message indicating that the VM cannot be activated. In this way, when the activated VM is being migrated or the migration of the VM is suspended, the VM is guarded against activation thereof.

At an attempt to re-activate a virtual machine, if information indicating that the virtual machine is being migrated has been stored, the virtual machine activator 1300 can prevent the re-activation of the virtual machine.

Figure 11:
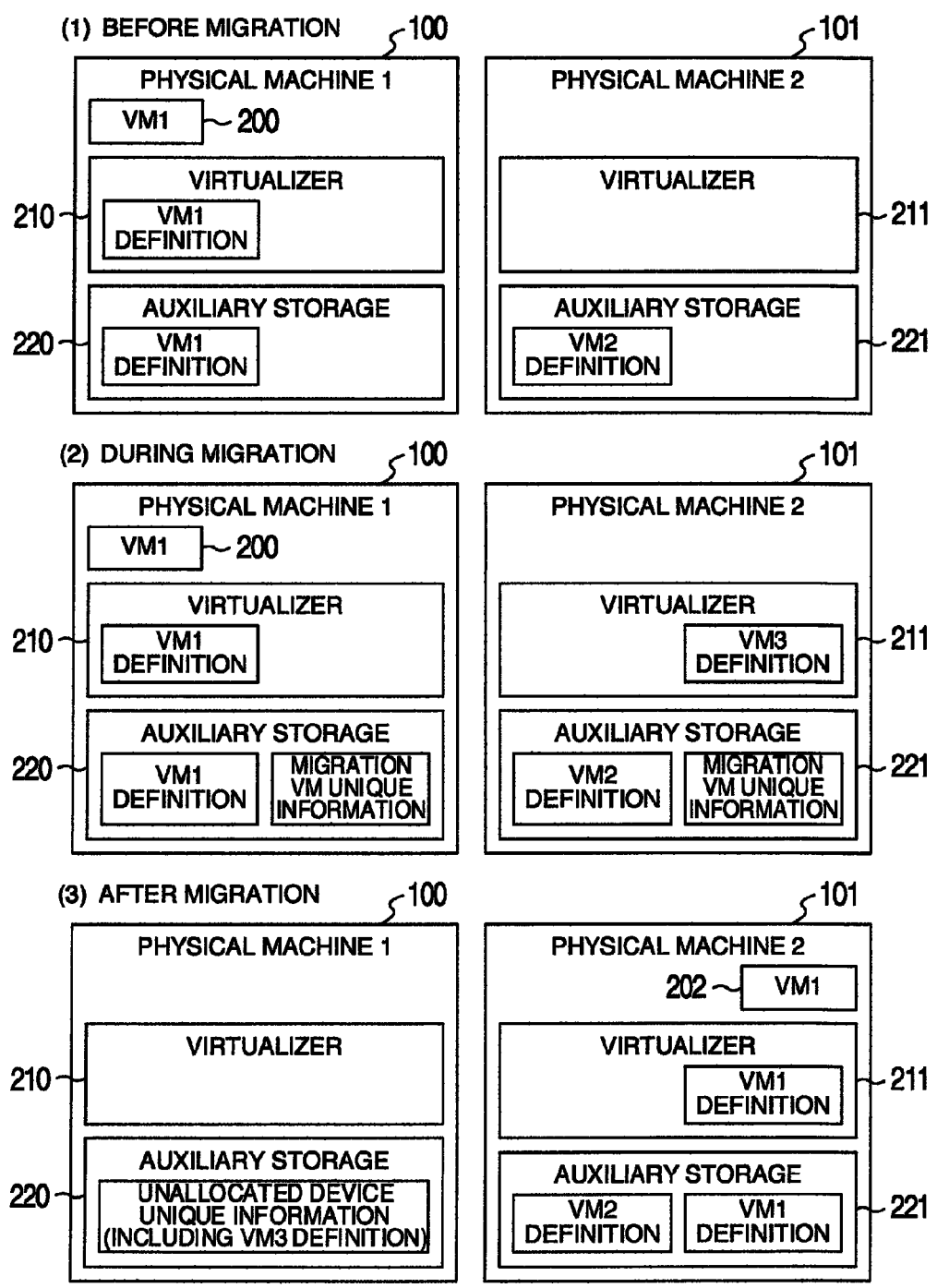
FIG. 11 is a diagram showing information kept in a virtualizer and an auxiliary storage in the before-migration, during-migration, and after-migration states in an embodiment of the present invention.

FIG. 11 shows information kept in the virtualizers and the auxiliary storages before, during, and after VM migration.

(1) Before VM migration, the VM1 is running on the physical machine 1, and the definition of the VM1 is in the memory 215 of the virtualizer 210 and the auxiliary storage 220. In the physical machine 2, the definition of the VM2 is stored in the auxiliary storage 221, but it is indicated that the VM2 has not been activated.

(2) During VM migration, the VM3 (202) to be used as a provisional definition of the migration destination of the VM1 is defined in the physical machine 2, the definition of the VM3 is in the memory 215 of the virtualizer 211, and the migration VM unique information is stored in the auxiliary storages 220 and 221 respectively of the physical machines 1 and 2.

(3) After VM migration, the VM1 (200) is running on the physical machine 2, the definition of the VM1 is in the memory 215 of the virtualizer 211 and the auxiliary storage 221. In the physical machine 1, the unique information pieces such as the WWN and the MAC address of the VM3 are stored in the auxiliary storage 220. The unique information pieces will be used for any VM definition to be created in future.

As above, according to the first embodiment, a virtualizer of a migration source having received a request to migrate a virtual machine cooperates with a virtualizer of a migration destination, to thereby migrate the virtual machine. Even if the VM migration is suspended, the suspended state of the VM migration can be released (recovery of the migration) through cooperation of the migration-source and migration-destination virtualizers.

By executing the processing as above, even the managing server is in failure, the virtual machine can be securely migrated.

Embodiment 2

In the second embodiment, the physical machine 100 of the first embodiment further includes a migration destination candidate table 600 shown in FIG. 6. In the computer system of the second embodiment, even if the migration-destination machine is not designated to migrate a virtual machine, the virtualizer 210 migrates the virtual machine to a second physical machine.

In step 810 of the migration control procedure described in conjunction with FIG. 8, if the indication of the migration-destination machine is absent (missing), the virtualizers 210 selects from the migration destination candidate table 600 a physical machine as the migration destination by use of an address of a virtualizer beforehand registered to the migration destination candidate table 600.

If there exist a plurality of candidate physical machines, the virtualizers 210 repeatedly issues an associated inquiry to the virtualizer 210 of each physical machine registered to the migration destination candidate table 600 until the migration destination is determined. When the migration destination is determined, the processing is sequentially executed beginning at step 810.

Through the processing described above, even if there exists no managing server to manage a plurality of physical machines, it is possible to select a physical machine as the VM migration destination from a plurality of physical machines.

Embodiment 3

Figure 7:
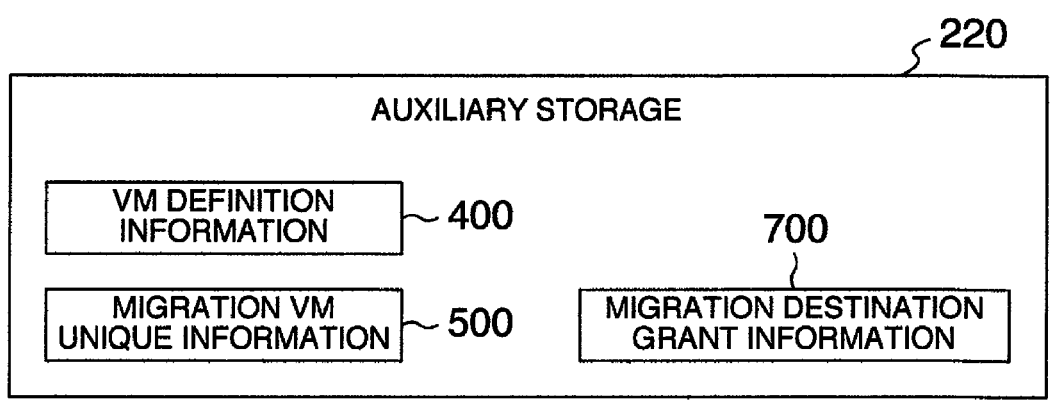
FIG. 7 is a diagram showing migration destination grant information kept in an auxiliary storage of a physical machine in a third embodiment of the present invention.

The third embodiment is a computer system in which the physical machine 100 of the first embodiment includes migration destination grant information 700 shown in FIG. 7 to prevent migration of a virtual machine.

If it is required to sustain performance of a virtual machine running on the physical machine 100, VM migration destination prevention information is registered to the migration destination grant information 700 in advance.

In step 835 of the migration control procedure described in conjunction with FIG. 8, the information items of the migration destination grant information 700 are examined to determine whether or not it is possible to create a migration-destination virtual machine in the migration-destination machine. If the VM migration destination prevention information has been registered to the migration destination grant information 700, a message "VM migration is not possible" is sent to the migration-source machine.

Through the processing described above, even if there exists no managing server to monitor performance of physical machines, it is possible to prevent migration of a virtual machine to the physical machine executing a virtual machine the performance of which is to be sustained.

While the present invention has been specifically described with reference to the particular illustrative embodiments, it is not to be restricted by those embodiments but only by the appended claims. It is to be appreciated that those skilled in the art can change or modify the embodiments without departing from the scope and spirit of the present invention.

The invention claimed is:

1. A computer system comprising a plurality of real machines, wherein:
   each of the real machines comprises a Central Processing Unit (CPU), a storage, and a virtualizer to execute at least one virtual machine on the real machine;
   the real machines comprise a first real machine and a second real machine which are linked via a network to each other;
   the first real machine is a migration source to migrate a virtual machine being executed on the first real machine to the second real machine, and comprises a first virtualizer and a first storage to store unique information of the virtual machine to be executed by the first virtualizer;
   the second real machine is a migration destination to which a virtual machine being executed on the first real machine is migrated from the first real machine, and comprises a second virtualizer and a second storage to store unique information of the virtual machine to be executed by the second virtualizer;
   at reception of a migration request of the virtual machine, the first virtualizer sends, to the second virtualizer, first unique information which is unique information of target virtual machine of the migration request;
   the second virtualizer receives the first unique information from the first virtualizer, creates a virtual machine on the second virtualizer based on the first unique information, saves the first unique information and second unique information which is unique information of the virtual machine created based on the first unique information, as migration virtual machine information of the second real machine in the second storage, and sends the second unique information to the first virtualizer; and
   the first virtualizer receives the second unique information and saves, in the first storage, the first unique information and the second unique information received from the second virtualizer, as migration virtual machine information of the first real machine;
   wherein the unique information comprises address information of a virtual Host Bus Adapter (HBA) required for the virtual machine to access an external storage and address information of a virtual Interface Card (NIC) required for the virtual machine to connect to the network,
   wherein the first storage keeps, as first definition information, unique information of at least one virtual machine to be executed on the first real machine, the unique information including the first unique information;
   the second storage keeps, as second definition information, unique information of at least one virtual machine to be executed on the second real machine, the unique information including the second unique information;
   the first virtualizer executes first migration-source processing in which the first virtualizer sends state information of a state of the virtual machine as the migration request target to the second virtualizer, and invalidates the virtual machine as the migration request target;
   the second virtualizer executes first migration-destination processing in which the second virtualizer receives the state information from the first virtualizer, sets the state information to the virtual machine created based on the first unique information, validates the virtual machine to which the state information is set, updates the second unique information included in the migration virtual machine information of the second real machine to unique information of the virtual machine thus validated and saves the unique information as new second unique information, updates the second unique information included in the second definition information to the new second unique information and saves the new second unique information, and notifies the first virtualizer of an event that the new second unique information has been saved in the migration virtual machine information and the second definition information of the second real machine,
   the first virtualizer executes second migration-source processing in which the first virtualizer receives the notification of the saving of the new second unique information from the second virtualizer, changes the first unique information included in the first definition information to the second unique information included in the first migration virtual machine information, notifies the change of the first unique information to the second virtualizer, and deletes the migration virtual machine information of the first real machine; and
   the second virtualizer executes second migration-destination processing in which the second virtualizer receives the notification of the change of the first definition information from the first virtualizer, and deletes the migration virtual machine information of the second real machine.

2. A computer system according to claim 1, wherein the state information comprises data being used by the virtual machine of the migration request target included in the first storage and data of registers of the first real machine, the registers being used by the virtual machine of the migration request target.

3. A computer system according to claim 1, wherein
   if at least one of the first migration-destination processing, the second migration-destination processing, the first migration-source processing, and the second migration-source processing is not completed,
   a migration recovery section of either one of the first and second virtualizers makes a check to determine whether or not the migration virtual machine information of the first real machine is present in the first real machine, and makes a check to determine whether or not the migration virtual machine information of the second real machine is present in the second real machine;
   if the migration virtual machine information of the first real machine is absent from the first real machine and the migration virtual machine information of the second real machine is absent from the second real machine, the migration recovery section assumes that the first migration-destination processing, the second migration-destination processing, the first migration-source processing, and the second migration-source processing have been completed, and
   if at least either one of the migration virtual machine information of the first real machine and the migration virtual machine information of the second real machine is present, the migration recovery section makes a check to determine whether or not the first unique information is saved in the first storage,
   if the first unique information is not saved in the first storage, the migration recovery section assumes that the second migration-destination processing has not been completed, validates the virtual machine to which the state information has been set, and deletes the migration virtual machine information of the first real machine and the migration virtual machine information of the second real machine;
   if the first unique information is saved in the first storage, the migration recovery section makes a check to determine whether or not the new second unique information is saved in the second storage;

if the new second unique information is not saved in the second storage, the migration recovery section assumes that the first migration-destination processing has not been completed, validates the virtual machine as the migration request target, and deletes the migration virtual machine information of the first real machine and the migration virtual machine information of the second real machine;

if the new second unique information is saved in the second storage, the migration recovery section assumes that the second migration-source processing has not been completed, validates the virtual machine to which the state information has been set, and deletes the migration virtual machine information of the first real machine and the migration virtual machine information of the second real machine.

4. A computer system according to claim 1, wherein each of the first and second virtualizers comprises communication means to conduct communication via the network, the virtualizer using the communication means to migrate the virtual machine as the migration request target from the first real machine to the second real machine.

5. A computer system according to claim 1, wherein the first storage comprises migration-destination candidate information to store a candidate of a real machine to be used as a migration destination of the virtual machine as the migration request target, and if the real machine to be used as a migration destination is absent from the migration request, the first virtualizer refers to the migration-destination candidate information to thereby determine the real machine to be used as a migration destination.

6. A computer system according to claim 1, wherein the second storage comprises migration grant information indicating whether or not migration of the virtual machine as the migration request target is granted, the second virtualizer refers, in creation of the virtual machine on the second virtualizer based on the first unique information, to the migration grant information of the second storage, and notifies, if the migration grant information indicates that the migration of the virtual machine is not granted, an event that the migration of the virtual machine as the migration request target is not granted, to the first real machine.

7. A computer comprising:

a CPU, a storage, and a virtualizer to execute at least one virtual machine (VM1, VM2) on a real machine, wherein, when the computer is a migration source, a migration controller of the virtualizer identifies, at reception of a migration request of a virtual machine, a real machine as a migration destination of migration of the virtual machine according to the migration request, sends first unique information as unique information of the virtual machine as the migration request target to the real machine as the migration destination, obtains, from the real machine as the migration destination, second unique information as unique information of the virtual machine created based on the first unique information on the real machine as the migration destination, and saves the first unique information and the second unique information obtained from the virtualizer of the migration destination, as migration virtual machine information in the storage;

the storage keeps, as definition information, unique information of at least one virtual machine to be executed, the virtualizer executes first processing in which the virtualizer sends state information of the virtual machine as the migration request target to the real machine of the migration destination and invalidates the virtual machine as the migration request target, the virtualizer executes second processing in which the virtualizer changes the unique information in the definition information to the second unique information included in the migration virtual machine information, sends an event of the change to the real machine of the migration destination, and deletes the migration virtual machine information from the storage;

wherein if at least one of the first processing and the second processing has not been completed, the virtualizer makes a check to determine whether or not the migration virtual machine information is present in the real machine;

if the migration virtual machine information is absent from the real machine, the virtualizer assumes that the first processing and the second processing have been completed, and if the migration virtual machine information is present in the real machine, the virtualizer makes a check to determine whether or not the first unique information is saved in the storage, if the first unique information is not saved in the storage, the virtualizer indicates validation of the virtual machine created based on the first unique information, to the real machine of the migration destination and deletes the migration virtual machine information;

if the first unique information is saved in the storage, the virtualizer makes a check to determine whether or not the first unique information is saved in the real machine as the migration destination;

if the first unique information is not saved in the real machine as the migration destination, the virtualizer assumes that the second processing has not been completed, validates the virtual machine as the migration request target, and deletes the migration virtual machine information; and if the first unique information is saved in the real machine as the migration destination, the virtualizer indicates validation of the virtual machine created based on the first unique information, to the real machine as the migration destination and deletes the migration virtual machine information.

8. A computer comprising:

a CPU, a storage, and a virtualizer to execute at least one virtual machine (VM1, VM2) on a real machine, wherein, when the computer is a migration source, a migration controller of the virtualizer identifies, at reception of a migration request of a virtual machine, a real machine as a migration destination of migration of the virtual machine according to the migration request, sends first unique information as unique information of the virtual machine as the migration request target to the real machine as the migration destination, obtains, from the real machine as the migration destination, second unique information as unique information of the virtual machine created based on the first unique information on the real machine as the migration destination, and saves the first unique information and the second unique information obtained from the virtualizer of the migration destination, as migration virtual machine information in the storage, wherein, when the computer is a migration destination, a migration controller of the virtualizer identifies, at reception of the migration request of the virtual machine, a real machine as a migration destination of migration of the virtual machine according to the migration request, obtains the first unique information from the real machine as the migration source, creates a virtual machine on the virtualizer based on the first unique information which is the first unique information obtained from the migration source, saves the first unique information and second unique information as unique information of the virtual machine created based on the first unique information, as migration virtual machine information in the storage, and sends the second unique information to the real machine as the migration source;

wherein the storage keeps, as definition information, unique information of at least one virtual machine to be executed, the virtualizer executes first processing in which the virtualizer obtains state information of a state of the virtual machine as the migration request target from the real machine as the migration source, sets the state information to the virtual machine created based on the first unique information, validates the virtual machine to which the state information is set, updates the second unique information included in the migration virtual machine information to unique information of the virtual machine thus validated and saves the unique information as new second unique information, updates the second unique information included in the definition information to the new second unique information and saves the new second unique information, notifies the real machine as the migration source of an event that the new second unique information is saved in the migration virtual machine information and the definition information, and executes second processing in which the virtualizer deletes the migration virtual machine information.

9. A computer according to claim 8, wherein if at least one of the first processing and the second processing is not completed, the virtualizer makes a check to determine whether or not the migration virtual machine information is present in the real machine;

if the migration virtual machine information is absent from the real machine, the virtualizer assumes that the first processing and the second processing have been completed, and if the migration virtual machine information is present in the real machine, the virtualizer makes a check to determine whether or not the first unique information is saved in the real machine as the migration source, if the first unique information is not saved in the real machine as the migration source, the virtualizer assumes that the second processing has not been completed, validates the virtual machine to which the state information is set, and deletes the migration virtual machine information;

if the first unique information is saved in the real machine as the migration source, the virtualizer makes a check to determine whether or not the new second unique information is stored in the storage, if the new second unique information is not stored in the storage, the virtualizer assumes that the first processing has not been completed, indicates validation of the virtual machine as the migration request target to the real machine as the migration source, and deletes the migration virtual machine information; and if the new second unique information is stored in the storage, the virtualizer validates the virtual machine to which the state information is set, and deletes the migration virtual machine information.

* * * * *